United States Patent
Zhou et al.

(10) Patent No.: US 12,018,529 B2
(45) Date of Patent: Jun. 25, 2024

(54) SPIRAL MAGNETIC FLUID COMPOSITE SEALING STRUCTURE OF ROLLER BIT

(71) Applicant: SOUTHWEST PETROLEUM UNIVERSITY, Chengdu (CN)

(72) Inventors: Yi Zhou, Chengdu (CN); Fuxiao Zhang, Chengdu (CN); Xinlin Lei, Chengdu (CN); Ruchen Wang, Chengdu (CN); Wenchao Song, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 18/122,737

(22) Filed: Mar. 17, 2023

(65) Prior Publication Data
US 2023/0374864 A1    Nov. 23, 2023

(30) Foreign Application Priority Data
May 19, 2022  (CN) .......................... 202210545596.8

(51) Int. Cl.
*E21B 10/25* (2006.01)
*F16J 15/43* (2006.01)

(52) U.S. Cl.
CPC ............... *E21B 10/25* (2013.01); *F16J 15/43* (2013.01)

(58) Field of Classification Search
CPC .................................. E21B 10/25; F16J 15/43
See application file for complete search history.

(56) References Cited

U.S. PATENT DOCUMENTS

| | | | | |
|---|---|---|---|---|
| 3,620,584 A * | 11/1971 | Rosensweig | .......... | F16C 33/765 384/446 |
| 3,726,574 A * | 4/1973 | Tuffias | .......... | F16C 17/026 384/441 |
| 3,746,405 A * | 7/1973 | Welton | .......... | E21B 10/24 384/93 |
| 3,746,407 A * | 7/1973 | Stiles | .......... | F16C 33/107 310/90.5 |
| 3,834,775 A * | 9/1974 | Tuffias | .......... | F16J 15/43 277/410 |
| 6,176,331 B1 * | 1/2001 | Jin | .......... | F16C 33/72 175/359 |
| 7,621,346 B1 * | 11/2009 | Trinh | .......... | E21B 10/24 384/93 |
| 2007/0045008 A1 * | 3/2007 | Dick | .......... | E21B 10/22 175/371 |

* cited by examiner

*Primary Examiner* — Blake Michener
(74) *Attorney, Agent, or Firm* — Bayramoglu Law Offices LLC

(57) ABSTRACT

A spiral magnetic fluid composite sealing structure of a roller bit comprising a cone leg and a roller, wherein the roller and the cone leg are in rotatable connection in a fitting manner through a roller inner hole and a cone leg shaft journal, a sealing groove is formed in an opening end of the roller inner hole, and a spiral magnetic fluid sealing assembly is arranged in the sealing groove. Through the arrangement of the spiral magnetic fluid sealing assembly, a spiral sand discharging effect is realized, compared with a passive sealing mode, the sealing performance is greatly improved by active sand discharging mode, and the service life of sealing is significantly prolonged; a slurry sealing effect of magnetic fluid seals is realized, resulting the sealing gap is tightly sealed under the magnetic action; in addition, the automatic compensation function of magnetic fluid can also be realized.

2 Claims, 2 Drawing Sheets

SPIRAL MAGNETIC FLUID COMPOSITE SEALING STRUCTURE OF ROLLER BIT

CROSS-REFERENCE TO THE RELATED APPLICATION

This application is based upon and claims priority to Chinese Patent Application No. 202210545596.8, filed on May 19, 2022, the entire content of which is incorporated herein by reference.

TECHNICAL FIELD

The present invention relates to the technical field of roller bit bearing seals, and in particular to a spiral magnetic fluid composite sealing structure of a roller bit.

BACKGROUND

Roller bits are one of the most widely used drilling bits. When the roller bit works, the cutting teeth are alternatively in contact with the bottom of the well, since the rock breaking torque is small, the contact area between the cutting teeth and the bottom of the well is small, the specific pressure is high, the roller bit is easy to enter into the stratum, and the total length of the working blade is large, the wear can be reduced. The service life of roller bits depends on the service life of bearing seals. The problems of the existing roller bit seals are as follows: 1) most of the existing roller bit seals (except for spiral combined seals) are in a passive sealing mode, and cannot realize an active sand discharging function, 2) the existing roller bit seals are difficult to realize a complete slurry sealing function, for example, although the spiral combined seals can realize the active sand discharging function, slurry liquid can enter a sealing gap when spiral abrasion fails or a bit stops rotating, so that the slurry liquid enters a bearing to cause bearing wear, and then the wear-out bearing may fail, and thus slurry sealing is difficult; and 3) the failure of the existing roller bit seals cannot realize the automatic compensation function, which leads to serious seal wear and premature failure, if the main sealing surface of metal floating seal is metal ring contact surface, when the sealing surface of the metal ring is worn, slurry may enter a bearing from the worn sealing surface due to the fact that metal does not have elastic deformation supplement capability.

Therefore, it is one of the technical problems to be solved in the art how to provide a spiral magnetic fluid composite sealing structure of a roller bit with active sand discharge, slurry sealing and automatic compensation functions.

SUMMARY

In view of this, the present invention provides a spiral magnetic fluid composite sealing structure of a roller bit, so as to solve the above defects.

In order to solve the above technical problem, the present invention adopts the following technical scheme:

Provided is a spiral magnetic fluid composite sealing structure of a roller bit, comprising: a cone leg and a roller, wherein the roller and the cone leg are in rotatable connection in a fitting manner through a roller inner hole and a cone leg shaft journal, a sealing groove is formed in an opening end of the cone inner hole; and a spiral magnetic fluid sealing assembly is arranged in the sealing groove.

Preferably, the spiral magnetic fluid sealing assembly comprises a magnetic fluid, magnetic poles, permanent magnets and pole teeth, wherein a spiral groove is formed in a side wall of the sealing groove; the magnetic poles and the permanent magnets are arranged in the spiral groove; the pole teeth are arranged at an end part of one end of the magnetic pole close to the cone leg shaft journal; the magnetic fluid is arranged in an inner gap of the sealing groove.

Preferably, a steel ball for connecting the cone leg shaft journal and the roller is arranged between the cone leg shaft journal and the roller.

Compared with the prior art, the present invention achieves the following technical effects:
1) The present invention has the spiral sand discharging effect; compared with a passive sealing mode, the active sand discharging mode has the advantages that the sealing performance is greatly improved, and the service life of sealing is significantly prolonged.
2) The present invention has the slurry sealing effect of magnetic fluid seals, since the magnetic fluid is a highly-stable magnetic colloidal solution, the sealing gap is tightly sealed under the magnetic action, and slurry particles can be effectively prevented from entering the inside of the bearing from the gap, thus the slurry sealing effect is realized.
3) The present invention has the automatic compensation function of the magnetic fluid, since the magnetic liquid has fluidity, the magnetic liquid can automatically compensate the changing sealing gap and adapt to the special requirements of the variable rotation speed of the roller bit on the sealing performance.
4) Through the composite sealing structure of the present invention, the sealing wear resistance and reliability can be effectively improved, the sealing service life is prolonged, and the drilling cost is reduced.

In the figures, 1 is cone leg; 2 is roller; 3 is cone leg shaft journal; 4 is sealing groove; 5 is spiral magnetic fluid sealing assembly; 51 is magnetic fluid; 52 is magnetic pole; 53 is permanent magnet; 54 is pole tooth; and 6 is steel ball.

DETAILED DESCRIPTION OF THE EMBODIMENTS

The technical schemes in the embodiments of the present invention will be clearly and completely described below with reference to the drawings in the embodiments of the present invention, and it is obvious that the described embodiments are only a part of the embodiments of the present invention but not all of them. Based on the embodiments of the present invention, all other embodiments obtained by those of ordinary skill in the art without creative effort shall fall within the protection scope of the present invention.

Embodiments

Figure 1:
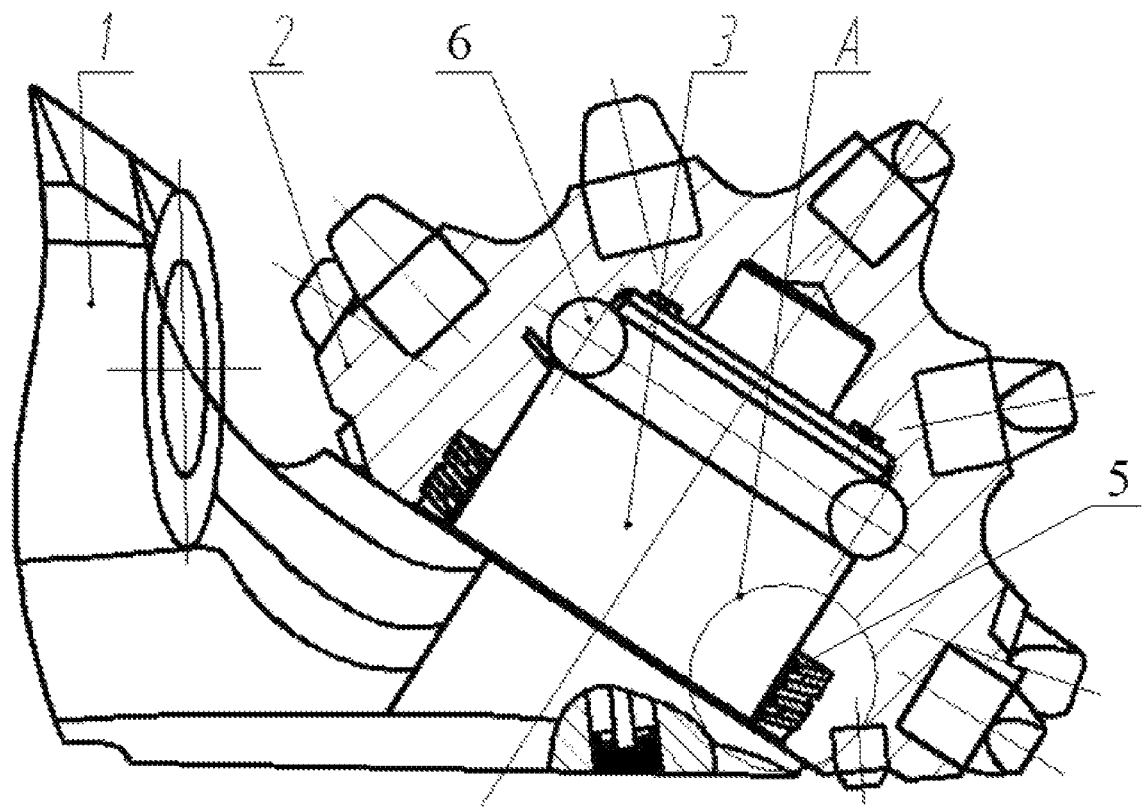
FIG. 1 is a schematic structural diagram of a spiral magnetic fluid composite sealing structure of a roller bit according to the present invention.
Figure 2:
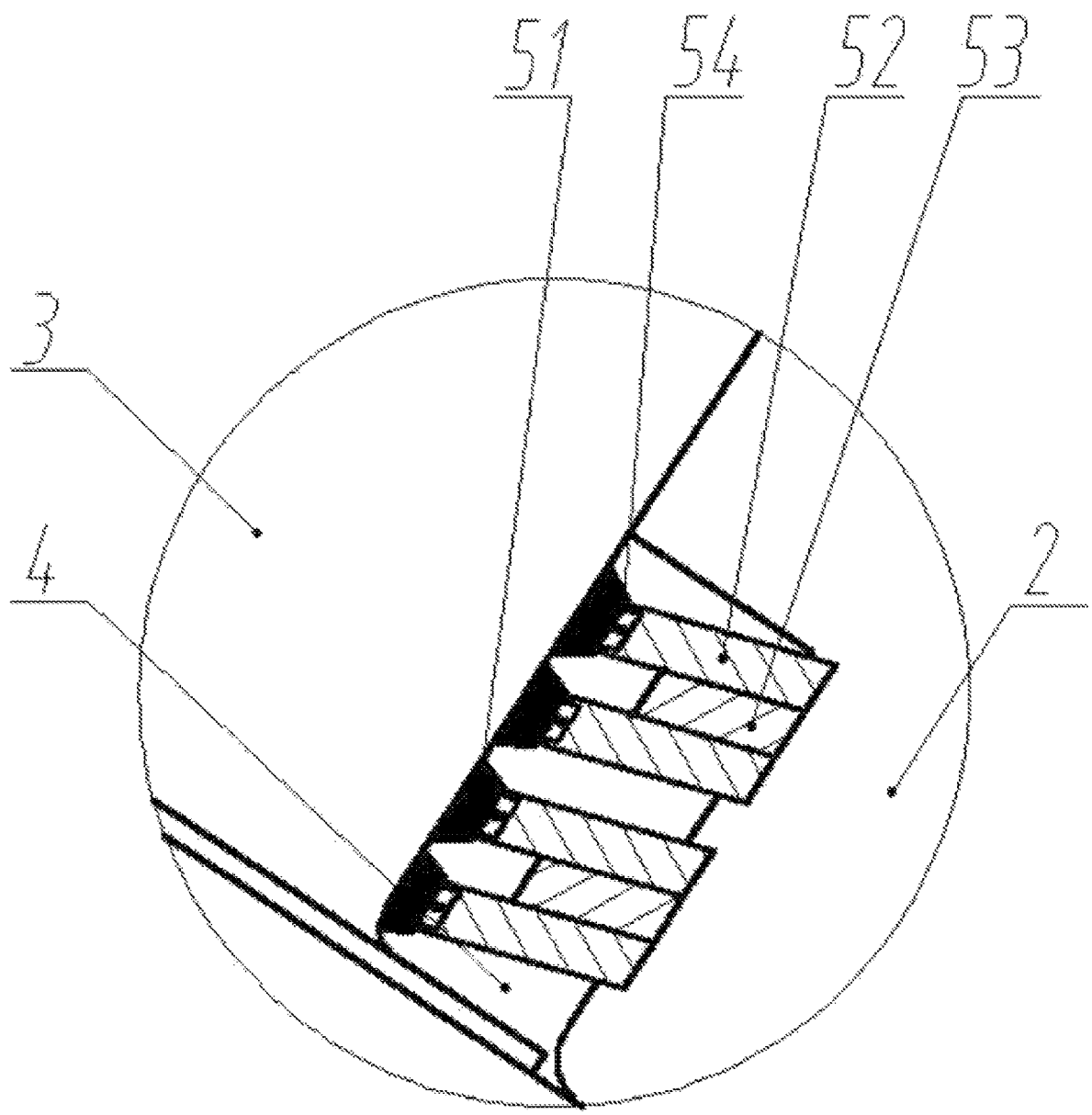
FIG. 2 is an enlarged view of a portion A of FIG. 1.

Referring to FIGS. 1-2, the present invention discloses a spiral magnetic fluid composite sealing structure of a roller bit, which comprises: a cone leg 1 and a roller 2, wherein a cone leg shaft journal 3 is arranged on the cone leg 1; a bottom end of the roller 2 is inwards sunken to form a roller inner hole matched with the cone leg shaft journal 3; the roller 2 and the cone leg 1 are in rotatable connection in a fitting manner through the roller inner hole and the cone leg shaft journal 3, and a sealing groove 4 is formed in an opening end of the roller inner hole; a spiral magnetic fluid sealing assembly 5 is arranged in the sealing groove 4.

In this embodiment, the spiral magnetic fluid sealing assembly 5 comprises a magnetic fluid 51, magnetic poles 52 and permanent magnets 53; a spiral groove is formed in a side wall of the sealing groove 4; the magnetic poles 52 and the permanent magnets 53 are mounted in the spiral groove; pole teeth 54 are arranged at an end part of one end of the magnetic pole 52 close to the cone leg shaft journal 3; the pole teeth 54 are integral with the magnetic poles 52; the magnetic fluid 51 is injected into the inner sealing gap of the sealing groove 4, the permanent magnets 53, the magnetic poles 52 and the middle cone leg shaft journal 3 form a complete magnetic circuit which firmly adsorbs the magnetic fluid 51 into the sealing gap to form multi-stage magnetic liquid sealing.

In this embodiment, the magnetic poles 52 and the permanent magnets 53 are grouped and mounted in the spiral groove in a combination mode of "magnetic pole 52-permanent magnet 53-magnetic pole 52" to form a spiral magnetic pole structure.

In this embodiment, a steel ball 6 for connecting the cone leg shaft journal 3 and the roller 2 is arranged between the cone leg shaft journal 3 and the roller 2, the steel ball 6 is put into the cone leg shaft journal from the plug hole and then the plug is welded and fixed, and the roller 2 is held on the cone leg shaft journal 3 by the steel ball 6.

Spiral sand discharge: the spiral magnetic pole structure is mounted in a sealing groove in the roller inner hole and rotates together with the roller bit, when the bit rotates at a high speed, the roller drives the spiral structure to rotate, thereby generating outward pumping thrust, and after the pumping thrust generated by rotation of the roller is balanced with the pressure of external slurry and gravel entering the sealing structure, slurry media cannot enter the sealing structure to cause bearing wear failure, so that the present invention has the sand self-discharging function.

Slurry sealing of magnetic fluid: the spiral magnetic fluid sealing assembly can directly prevent slurry and gravel from entering the inside of the bearing from a gap between the bearing and the sealing structure, which plays a role in slurry sealing, and simultaneously prevent lubricating grease in the bearing from leaking. The sealing structure is characterized in that a plurality of pole teeth are processed on the inner circle surface of magnetic poles, the magnetic liquid is positioned and directionally moved to a sealing gap formed between the pole teeth with magnetic conductivity and a rotating shaft by utilizing the characteristic of quick response of the magnetic liquid to an external magnetic field, a plurality of closed magnetic conduction circuits are formed by the magnetic poles, the permanent magnets and the rotating shaft, and a strong magnetic field is formed in the sealing gap between the pole teeth and the rotating shaft, so that a plurality of stable O-shaped liquid sealing rings can be generated in the sealing gap between the pole teeth and the rotating shaft to form multi-stage magnetic liquid sealing, thereby realizing a good sealing effect.

Automatic compensation of magnetic fluid: the magnetic liquid has the characteristics of automatic compensation function and quick repair of the magnetic sealing rings, and once the sealing gap is enlarged, the magnetic fluid may flow to the large gap to fill the large gap because the magnetic liquid has the fluidity of the liquid and is added into the sealing gap with certain saturation magnetization; if the gap diminishes, unnecessary magnetic fluid may be extruded to the gap, so as to reach good automatic compensation effect, so that the unstable sealing problem of the roller bit under the changing gap and variable rotation speed conditions can be effectively solved.

It should be understood that the above embodiments are only for clarity of illustration and are not intended to limit the embodiments. For those of ordinary skill in the art, other variations and modifications in different forms can be made on the basis of the above description. It is not necessary and impossible to exhaust all the embodiments herein. However, the obvious variations or modifications derived therefrom still fall within the protection scope created by the present invention.

The invention claimed is:

1. A spiral magnetic fluid composite sealing structure of a roller bit, comprising:
    a cone leg; and
    a roller;
    wherein the roller and the cone leg are in rotatable connection in a fitting manner through a roller inner hole and a cone leg shaft journal, a sealing groove is formed in an opening end of the roller inner hole; and a spiral magnetic fluid assembly is arranged in the sealing groove;
    wherein the spiral magnetic fluid assembly comprises a magnetic fluid, magnetic poles, permanent magnets, and pole teeth, wherein a spiral groove is formed in a side wall of the sealing groove; the magnetic poles and the permanent magnets are arranged in the spiral groove; the pole teeth are arranged at an end part of one end of the magnetic pole close to the cone leg shaft journal; and the magnetic fluid is arranged in an inner gap of the sealing groove.

2. The spiral magnetic fluid composite sealing structure of a roller bit according to claim 1, wherein steel balls connecting the cone leg shaft journal and the roller are arranged between the cone leg shaft journal and the roller.

\* \* \* \* \*